Sept. 21, 1971  A. D. KOMPELIEN  3,606,970
CONTROL DEVICE FOR A PLURALITY OF STAGES OF ELECTRIC HEAT
WITH CURRENT RESPONSIVE MEANS FOR CONTROLLING A FAN
Filed Sept. 3, 1969
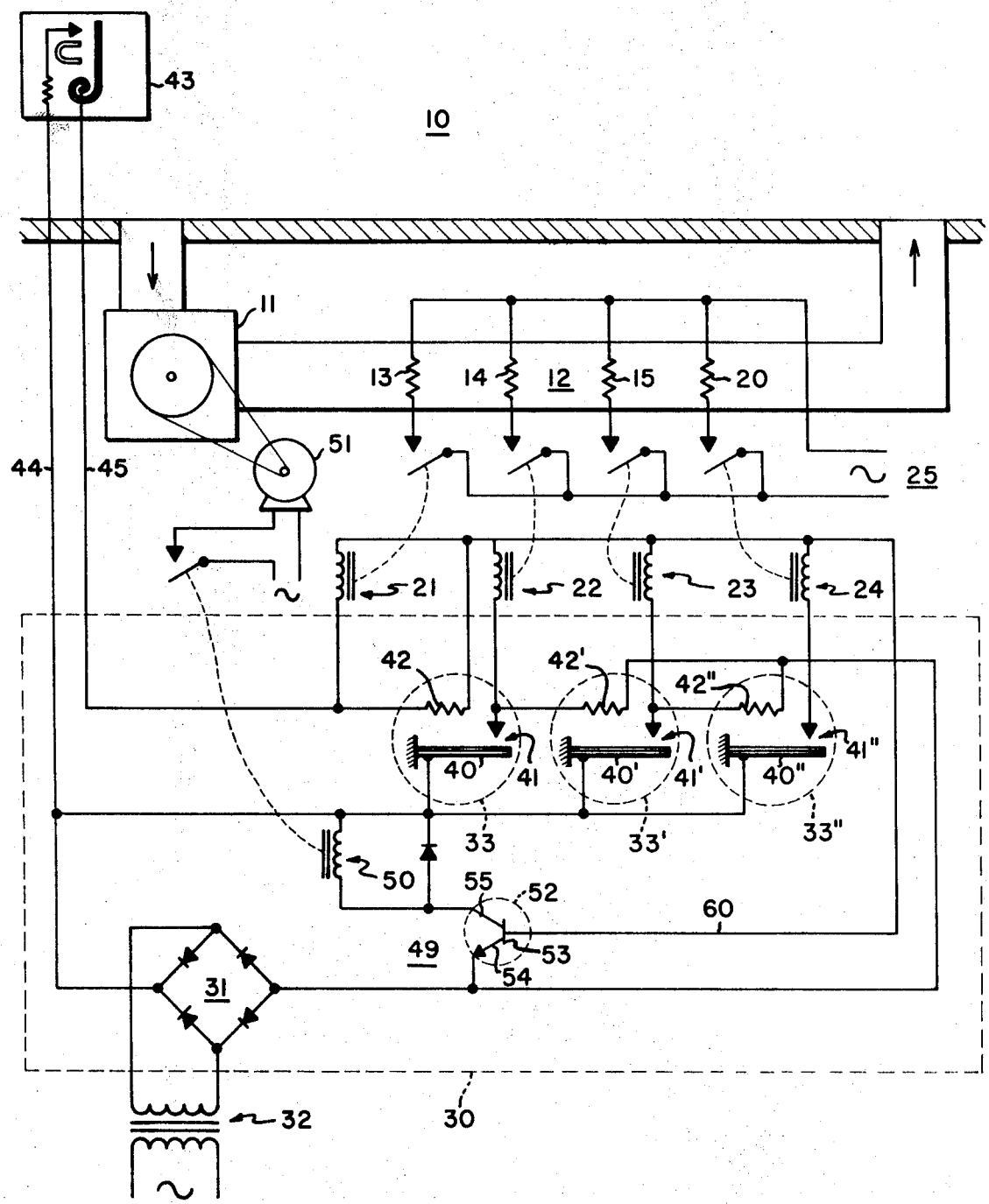
INVENTOR.
ARLON D. KOMPELIEN
BY
ATTORNEY.

United States Patent Office 3,606,970
Patented Sept. 21, 1971

3,606,970
CONTROL DEVICE FOR A PLURALITY OF STAGES OF ELECTRIC HEAT WITH CURRENT RESPONSIVE MEANS FOR CONTROLLING A FAN
Arlon D. Kompelien, Minneapolis, Minn., assignor to Honeywell Inc., Minneapolis, Minn.
Filed Sept. 3, 1969, Ser. No. 854,978
Int. Cl. H05b 1/02
U.S. Cl. 236—11
8 Claims

ABSTRACT OF THE DISCLOSURE

A control apparatus for controlling a plurality of stages of electric heat in sequence in response to a space thermostat and for controlling a fan for delivering heated air to the space when any one of the electric heaters is energized. The control of the fan is accomplished by a current responsive device responsive to the flow of current to any one of a plurality of actuators for energizing the electric heating stages.

BACKGROUND OF THE INVENTION

For many years sequencers have been used to control a plurality of stages of electric heating in response to the demands of a space thermostat. In these systems, various schemes have been provided for maintaining the fan delivering air to the space from the electric heaters in operation whenever one or more of the electric heaters is energized. Such schemes include the control of the fan by th first stage of a sequencer, the control of the fan by a temperature responsive device responding to the presence of heat in the furnace containing the electric heaters and/or the energization of the fan simultaneously with the energization of a first of the plurality of heaters.

The present invention is concerned with apparatus for maintaining energization of the fan when any one or more of a plurality of electric heaters of electric heating apparatus is energized. A current responsive means responds to the energization of any one of the actuators controlling the stages of electric heating to bring about energization of the fan. Even though the stages of the electric heating are brought into operation in one sequence and deenergized in the same sequence, the fan is maintained energized as long as any one of the electric heaters is in operation.

The invention is disclosed in a drawing showing a schematic representation of an electric heating installation wherein a plurality of electric heaters is energized in response to a space thermostat and the heat is delivered to the space by a fan with the electric heaters being controlled by a sequencing apparatus and the fan being energized as long as current is being delivered to the sequencing apparatus.

DESCRIPTION OF THE INVENTION

Referring to the drawing, condition medium or heated air is delivered to a space 10 by a fan 11 passing air through a duct or plenum 12 containing a plurality of condition changing means or electric heaters 13, 14, 15, and 20 respectively. Each of the heaters are controlled by actuator means or relays 21, 22, 23, and 24, respectively having associated switch means connecting a source of power 25 for energizing the heaters.

A panel 30 is adapted to control the stages of electric heaters in sequence and to control the energization of fan 11 as long as any one of the electric heaters is energized. Specifically panel 30 has a direct current source of power obtained from a bridge rectifier 31 connected to a power source 32. A plurality of thermally controlled actuators or switch means 33, 33', and 33" each comprises a bimetal 40 for closing a switch 41 when the temperature of the bimetal reaches some predetermined value when heated by a heater 42. Thermal actuators 33, 33', and 33" are connected to control relays or actuators 22, 23, and 24, respectively.

A conventional cycling thermostat or condition responsive means 43 in space 10 is connected to panel 30 by conductors 44 and 45 to very the level of output of heaters 13 to 20. When thermostat 43 provides a closed circuit between conductors 44 and 45 relay 21 is energized from power source 31. Connected in parallel with relay 21 is heater 42 so that upon the energization of the first stage of electric heat or heater 13 by relay 21, actuator 33 is energized and after a predetermined time period determined by the thermal characteristic of actuator 33, switch 41 is closed to energize the second stage of electric heat through relay 22. Actuators 33' and 33" are slaved on actuator 33 as a heater 42' of actuator 33' is connected to power source 31 by switch 41. Upon the energization of the second stage of electric heat, actuator 33' is energized and after a predetermined time period the third stage of electric heat 15 will be energized. Similarly, heater 42" of actuator 33" is connected to switch 41' of actuator 33' and after the third stage of electric heat 15 is energized by actuator 33', heater 42" is energized to bring about the energization of the fourth stage of electric heat 20 after a predetermined time period.

Upon the thermostat 43 becoming satisfied to open the circuits between circuit 44 and 45, the deenergization of the electric heating stages is brought about in the same sequence as the stages were energized as first stage 13 is deenergized and then as actuator 33 cools down, electric heating stage 14 will be deenergized. Similarly after actuator 33 is deenergized actuator 33' will cool down to deenergize the stage of electric heating 15 and subsequently the electric heaing stage 20 will be deenergized by actuator 33".

A fan relay 50 is connected to control the energization of the fan motor 51. Relay 50 is connected to the output of a power or current responsive apparatus 49 comprising a semiconductor current carrying device or transistor 52 having a base 53, an emitter 54 and a collector 55. Transistor 52 is connected to respond to the power or current flowing to one or more of relays 21, 22, 23, and 24 by the connection of base 53 to each of the relays by a circuit 60 and emitter 54 to the source of power of 31. When current flows between the base 53 and emitter 54, transistor 52 becomes conductive between collector 55 and emitter 54 to provide energization of relay 50. Transistor 52 is operative with a wide range of current without excessive overheating to control relay 50 with either one or several actuators 33 energized.

OPERATION OF THE INVENTION

Upon a call for heat in space 10 by thermostat 43, relay 21 and heater 42 of actuator 33 are simultaneously energized to immediately turn on the first stage of electric heating 13 and begin the heating of bimetal 40. Upon the flow of current from power source 31 to energize relay 21 and heater 42, current responsive means 49 cause the energization of fan relay 50 to turn on fan 11. Air is circulated to pass air over electric heater 13 to deliver heated air to space 10. Shortly thereafter depending upon the time delay of actuator 33, switch 41 will close to energize relay 22 and the second stage of electric heating 14. Simultaneously, heater 42' of actuator 33' is energized and after a predetermined time delay the third stage of electric heating 15 is energized. Similarly, a fourth stage of electric heating 20 is energized by actuator 33".

Whenever thermostat 43 becomes satisfied, which might take place before all of the stages of electric heating are energized, regardless of the number of electric heating stages which are energized when thermostat 43 opens relay 21 and thus the first stage of electric heating 13 is deenergized. As heater 42 cools down switch 41 will open to deenergize the second stage of electric heating and cause the subsequent actuators to be deenergized in sequence. Even though the first stage of electric heating, which was first to be energized is first to be deenergized, the fan will be maintained in operation and air will flow over the remaining electric heaters which are energized. When all of the relays 21, 22, 23, and 24, and only when all of these relays are deenergized to insure that all the stages of electric heating are off, current responsive means 49 becomes non-conductive to deenergize fan relay 50 and terminate the operation of fan 11.

The embodiments of the invention in which an exclusive property or right is claimed are defined as follows:

1. In condition control apparatus comprising:
a plurality of first actuator means adapted to control stages of condition changing apparatus,
a source of power,
first means connecting said plurality of first actuator means to said source of power to energize said actuator means for sequential operation,
power responsive means,
second means connecting said power responsive means to said first means to respond to the presence of power to control the energization of any one of said first actuator means when at least one of said first actuator means is energized,
second actuator means adapted to control apparatus associated with the condition changing apparatus, and
further means including said power responsive means for connecting said second actuator means to said source of power whereby said second actuator means is energized when at least one of said plurality of first actuator means is energized.

2. The invention of claim 1 wherein
said first actuator means being adapted to control a plurality of stages of temperature changing apparatus for furnishing temperature conditioned medium to a space,
said first means being adapted to be connected to a space temperature responsive means for controlling the temperature conditioning apparatus to maintain a predetermined space temperature, and
said second actuator means being adapted to control the energization of circulating means for delivery of the temperature conditioned medium to the space whereby upon the operation of any of the stages of temperature conditioning apparatus the medium is delivered to said space from the temperature conditioning apparatus.

3. The invention of claim 2 wherein,
said first actuator means are a plurality of thermally actuated switch means connected so that upon a call for a change in space condition a first and then a second of said switch means are energized in a first sequence, and said switch means are deenergized in said first sequence, and
said power responsive means comprising means to respond to the presence of current being supplied by said source to one or more of said thermally actuated switch means.

4. The invention of claim 1 wherein said power responsive means comprises,
a semiconductor current control means having an input control circuit and an output circuit,
circuit means including said second means for connecting a current supply circuit to said plurality of first actuator means to said input circuit, and
second circuit means including said further means for connecting said output circuit to control the current supply to said second actuator means.

5. The invention of claim 1 wherein
said first actuator means comprises relay means adapted to control a plurality of electric heaters,
said second actuator means comprises relay means adapted to control a fan circulating air from the heaters to a space, and
said power responsive means responds to the current supplied to at least one of said relay means and adapted to energize the fan when at least one heater is energized.

6. In a temperature control system for controlling the temperature in a space by supplying temperature conditioned medium to the space from a temperature conditioning apparatus having a plurality of levels of output wherein the supply of medium to the space is accomplished whenever the temperature conditioning apparatus is operating at any one of the levels of output comprising;
first means for controlling said levels of output of said temperature condition apparatus, and
second means responsive to the power supplied to said first means for controlling the supply of temperature conditioned medium to the space from said temperature conditioning apparatus whenever said temperature conditioning apparatus is providing at least one of said levels of said output.

7. The invention of claim 6 wherein
said first means comprises a plurality of current operated means, and
said second means comprises a current responsive means responsive to the presence of a predetermined level of current to said first means.

8. The invention of claim 6 wherein
said first means comprises an actuator means for controlling the level of output of the conditioning apparatus, said actuator having a source of power, and
said second means comprises means responsive to the supply of power to said actuator means from a source.

References Cited
UNITED STATES PATENTS

| | | | |
|---|---|---|---|
| 2,286,296 | 6/1942 | McGrath | 236—68 |
| 2,329,636 | 9/1943 | McGrath | 236—68 |
| 2,498,054 | 2/1950 | Taylor | 236—11UX |
| 2,699,292 | 1/1955 | Collins et al. | 236—11X |
| 3,421,691 | 1/1969 | Forbes | 236—9 |

EDWARD J. MICHAEL, Primary Examiner

U.S. Cl. X.R.

236—68